(12) United States Patent
Anderson

(10) Patent No.: US 11,487,192 B2
(45) Date of Patent: *Nov. 1, 2022

(54) OPTICAL REDIRECTION ADAPTER

(71) Applicant: Hand Held Products, Inc., Fort Mill, SC (US)

(72) Inventor: Donald Anderson, Locke, NY (US)

(73) Assignee: HAND HELD PRODUCTS, INC., Fort Mill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/800,291

(22) Filed: Feb. 25, 2020

(65) Prior Publication Data

US 2020/0192198 A1 Jun. 18, 2020

Related U.S. Application Data

(63) Continuation of application No. 16/019,040, filed on Jun. 26, 2018, now Pat. No. 10,599,021, which is a
(Continued)

(51) Int. Cl.
*H04N 5/238* (2006.01)
*G03B 17/00* (2021.01)
*G03B 17/56* (2021.01)
*H04N 5/225* (2006.01)
*H04N 5/232* (2006.01)
(Continued)

(52) U.S. Cl.
CPC .......... *G03B 17/565* (2013.01); *F21V 7/0008* (2013.01); *G02B 17/008* (2013.01); *H04N 5/2254* (2013.01); *H04N 5/238* (2013.01); *H04N 5/23296* (2013.01)

(58) Field of Classification Search
CPC ..... G03B 17/565; G03B 17/17; F21V 7/0008; G02B 17/008; H04N 5/2254; H04N 5/23296; H04N 5/238
See application file for complete search history.

(56) References Cited

U.S. PATENT DOCUMENTS 4,805,175 A 2/1989 Knowles
4,939,356 A 7/1990 Rando et al.
(Continued)

FOREIGN PATENT DOCUMENTS

CN 1599488 A 3/2005
CN 102289650 12/2011
(Continued)

OTHER PUBLICATIONS

Advisory Action (PTOL-303) dated Aug. 12, 2015 for U.S. Appl. No. 13/771,508.
(Continued)

*Primary Examiner* — Padma Haliyur
(74) *Attorney, Agent, or Firm* — Alston & Bird LLP

(57) ABSTRACT

An optical redirection adapter for an electronic device having a camera includes a housing. An optical element is attached to the housing and positioned such that, when the adapter is attached the electronic device, the optical element is positioned in the camera's field of view. The optical element reflects light in the camera's field of view from a redirection angle that is offset from the camera's field of view. The optical redirection adapter facilitates ergonomically sound use of the camera.

20 Claims, 4 Drawing Sheets

Related U.S. Application Data continuation of application No. 15/635,597, filed on Jun. 28, 2017, now Pat. No. 10,120,268, which is a continuation of application No. 15/082,393, filed on Mar. 28, 2016, now Pat. No. 9,696,612, which is a continuation of application No. 13/771,508, filed on Feb. 20, 2013, now Pat. No. 9,304,376.

(51) Int. Cl.
    *F21V 7/00*      (2006.01)
    *G02B 17/00*     (2006.01)

(56) References Cited

U.S. PATENT DOCUMENTS

| | | | |
|---|---|---|---|
| 4,983,818 A | 1/1991 | Knowles | |
| 5,155,346 A | 10/1992 | Doing et al. | |
| 5,258,604 A | 11/1993 | Behrens et al. | |
| 5,480,033 A | 1/1996 | Kalisiak | |
| 5,554,822 A | 9/1996 | Gilpin et al. | |
| 5,576,530 A | 11/1996 | Hagerty | |
| 5,702,059 A | 12/1997 | Chu et al. | |
| 5,796,088 A | 8/1998 | Wall | |
| 5,940,771 A | 8/1999 | Gollnick et al. | |
| 5,992,752 A | 11/1999 | Wilz et al. | |
| 6,149,063 A | 11/2000 | Reynolds et al. | |
| 6,177,950 B1 | 1/2001 | Robb | |
| 6,179,206 B1 | 1/2001 | Matsumori | |
| 6,687,346 B1 | 2/2004 | Swartz et al. | |
| 6,851,611 B1 | 2/2005 | Shaw-Sinclair | |
| 7,054,148 B2 | 5/2006 | Chen et al. | |
| 7,089,291 B1 | 8/2006 | Philyaw | |
| 7,224,894 B2 | 5/2007 | Kawakami | |
| 7,248,160 B2 | 7/2007 | Mangan et al. | |
| 7,364,077 B2 | 4/2008 | Wolf, II | |
| 7,584,885 B1 | 9/2009 | Douglass | |
| 8,016,194 B2 | 9/2011 | Hause et al. | |
| 8,282,005 B2 | 10/2012 | Cudzilo | |
| 8,346,979 B1 | 1/2013 | Lee | |
| 8,483,758 B2 | 7/2013 | Huang | |
| 8,733,657 B2 | 5/2014 | Harris | |
| 8,814,049 B2 | 8/2014 | Lee et al. | |
| 8,832,323 B2 | 9/2014 | Lee | |
| 8,856,033 B2 | 10/2014 | Hicks et al. | |
| 8,971,049 B1 | 3/2015 | Vier et al. | |
| 9,053,380 B2 | 6/2015 | Xian et al. | |
| 9,060,108 B1 * | 6/2015 | Kuffner | G02B 7/1827 |
| 9,122,941 B2 | 9/2015 | Hoobler et al. | |
| 9,304,376 B2 | 4/2016 | Anderson | |
| 9,696,612 B2 | 7/2017 | Anderson | |
| 10,120,268 B2 | 11/2018 | Anderson | |
| 10,599,021 B2 | 3/2020 | Anderson | |
| 2001/0027995 A1 | 10/2001 | Patel et al. | |
| 2001/0034222 A1 | 10/2001 | Roustaei et al. | |
| 2001/0035459 A1 | 11/2001 | Komai | |
| 2002/0017567 A1 | 2/2002 | Connolly et al. | |
| 2002/0027164 A1 | 3/2002 | Mault et al. | |
| 2002/0111921 A1 | 8/2002 | Aupperle | |
| 2002/0194075 A1 | 12/2002 | O'Hagan et al. | |
| 2003/0006998 A1 | 1/2003 | Kumar | |
| 2003/0101159 A1 | 5/2003 | Liou et al. | |
| 2003/0101233 A1 | 5/2003 | Liou et al. | |
| 2003/0209604 A1 | 11/2003 | Harrison | |
| 2003/0222150 A1 | 12/2003 | Sato et al. | |
| 2003/0236104 A1 | 12/2003 | Lin | |
| 2004/0031851 A1 | 2/2004 | Bianculli et al. | |
| 2004/0229593 A1 | 11/2004 | Wulff | |
| 2005/0026643 A1 | 2/2005 | White et al. | |
| 2005/0030707 A1 | 2/2005 | Richardson et al. | |
| 2005/0230472 A1 | 10/2005 | Chang | |
| 2005/0247787 A1 | 11/2005 | Von et al. | |
| 2006/0046793 A1 | 3/2006 | Hamilton et al. | |
| 2006/0105722 A1 | 5/2006 | Kumar | |
| 2006/0113389 A1 | 6/2006 | Barkan | |
| 2006/0266840 A1 | 11/2006 | Vinogradov et al. | |
| 2006/0284987 A1 | 12/2006 | Wolf, II | |
| 2007/0063048 A1 | 3/2007 | Havens et al. | |
| 2007/0145138 A1 | 6/2007 | Snyder et al. | |
| 2007/0165384 A1 | 7/2007 | Vejnar | |
| 2007/0297149 A1 | 12/2007 | Richardson et al. | |
| 2008/0017722 A1 | 1/2008 | Snyder et al. | |
| 2008/0018455 A1 | 1/2008 | Kulakowski | |
| 2008/0073433 A1 | 3/2008 | Nam | |
| 2008/0101026 A1 | 5/2008 | Ali | |
| 2008/0105743 A1 | 5/2008 | Mills | |
| 2008/0142603 A1 | 6/2008 | Mynhardt | |
| 2008/0294766 A1 | 11/2008 | Wang et al. | |
| 2009/0009945 A1 | 1/2009 | Johnson et al. | |
| 2009/0034169 A1 | 2/2009 | Richardson et al. | |
| 2009/0043205 A1 | 2/2009 | Pelissier et al. | |
| 2009/0066294 A1 | 3/2009 | Sabram | |
| 2009/0168337 A1 | 7/2009 | Conti et al. | |
| 2009/0224039 A1 | 9/2009 | Hause et al. | |
| 2009/0312053 A1 | 12/2009 | An | |
| 2010/0133339 A1 | 6/2010 | Gibson et al. | |
| 2010/0328420 A1 * | 12/2010 | Roman | H04N 7/147 |
| | | | 348/E7.083 |
| 2011/0007205 A1 | 1/2011 | Lee | |
| 2011/0198395 A1 | 8/2011 | Chen | |
| 2011/0309151 A1 | 12/2011 | Cudzilo | |
| 2012/0019920 A1 * | 1/2012 | Mongan | G02B 6/0035 |
| | | | 359/601 |
| 2012/0061462 A1 | 3/2012 | Shadwell et al. | |
| 2012/0286048 A1 | 11/2012 | Liu et al. | |
| 2013/0013813 A1 | 1/2013 | Lee | |
| 2013/0109316 A1 | 5/2013 | Lee | |
| 2013/0127309 A1 | 5/2013 | Wyner et al. | |
| 2013/0188943 A1 * | 7/2013 | Wu | G03B 17/17 |
| | | | 396/419 |
| 2013/0270336 A1 | 10/2013 | Bonomo et al. | |
| 2013/0329115 A1 | 12/2013 | Palmeri | |
| 2013/0341399 A1 | 12/2013 | Xian et al. | |
| 2014/0061312 A1 | 3/2014 | Tien | |
| 2014/0171150 A1 | 6/2014 | Hurst et al. | |
| 2014/0183260 A1 | 7/2014 | Sancak | |
| 2014/0249944 A1 | 9/2014 | Hicks et al. | |
| 2014/0285913 A1 * | 9/2014 | Palmeri | H04N 5/2252 |
| | | | 359/876 |
| 2014/0347000 A1 | 11/2014 | Hamann et al. | |
| 2014/0369575 A1 * | 12/2014 | Riopka | G06K 9/00046 |
| | | | 382/127 |
| 2015/0028104 A1 | 1/2015 | Ma et al. | |
| 2015/0041544 A1 | 2/2015 | Chen | |
| 2015/0115037 A1 | 4/2015 | Hoobler et al. | |
| 2015/0126245 A1 | 5/2015 | Barkan et al. | |
| 2015/0235068 A1 | 8/2015 | Gillet et al. | |
| 2015/0371072 A1 | 12/2015 | Liou | |
| 2016/0077307 A1 | 3/2016 | Palmeri | |
| 2016/0092711 A1 * | 3/2016 | Powell | G06K 7/10831 |
| | | | 235/462.06 |
| 2017/0299951 A1 | 10/2017 | Anderson | |
| 2018/0068300 A1 | 3/2018 | Saeed et al. | |

FOREIGN PATENT DOCUMENTS

| | | | |
|---|---|---|---|
| GB | 2511213 A | 8/2014 | |
| WO | WO-2012177661 A2 * | 12/2012 | A45C 11/00 |

OTHER PUBLICATIONS

Applicant Initiated Interview Summary (PTOL-413) dated Nov. 28, 2016 for U.S. Appl. No. 15/082,393.
Applicant Initiated Interview Summary (PTOL-413) dated Oct. 22, 2019 for U.S. Appl. No. 16/019,040.
Final Rejection dated Jun. 12, 2015 for U.S. Appl. No. 13/771,508.
Non-Final Rejection dated Aug. 12, 2016 for U.S. Appl. No. 15/082,393.
Non-Final Rejection dated Jan. 7, 2015 for U.S. Appl. No. 13/771,508.
Non-Final Rejection dated Jul. 9, 2019 for U.S. Appl. No. 16/019,040.
Non-Final Rejection dated Nov. 1, 2017 for U.S. Appl. No. 15/635,597.
Non-Final Rejection dated Sep. 2, 2014 for U.S. Appl. No. 13/771,508.

(56) References Cited

OTHER PUBLICATIONS

Notice of Allowance and Fees Due (PTOL-85) dated Dec. 2, 2015 for U.S. Appl. No. 13/771,508.
Notice of Allowance and Fees Due (PTOL-85) dated Jun. 28, 2018 for U.S. Appl. No. 15/635,597.
Notice of Allowance and Fees Due (PTOL-85) dated Mar. 2, 2017 for U.S. Appl. No. 15/082,393.
Notice of Allowance and Fees Due (PTOL-85) dated Mar. 2, 2018 for U.S. Appl. No. 15/635,597.
Notice of Allowance and Fees Due (PTOL-85) dated Nov. 15, 2019 for U.S. Appl. No. 16/019,040.
Search Report dated May 28, 2014 in corresponding GB application No. GB1402852.6; 1 page.
U.S. Appl. No. 16/019,040, filed Jun. 26, 2018, U.S. Pat. No. 10,599,021, Patented.
U.S. Appl. No. 15/635,597, filed Jun. 28, 2017, U.S. Pat. No. 10,120,268, Patented.
U.S. Appl. No. 15/082,393, filed Mar. 28, 2016, U.S. Pat. No. 9,696,612, Patented.
U.S. Appl. No. 13/771,508, filed Feb. 20, 2013, U.S. Pat. No. 9,304,376, Patented.
Intention to Grant received for Application No. 1402852.6, dated Aug. 20, 2017, 2 pages.
Notification to Grant received for Application No. 1402852.6, dated Sep. 12, 2017, 2 pages.

* cited by examiner

OPTICAL REDIRECTION ADAPTER

CROSS-REFERENCE TO RELATED APPLICATIONS

The present application is a continuation application of U.S. patent application Ser. No. 16/019,040, for Optical Redirection Adapter filed Jun. 26, 2018, which is a continuation application of U.S. patent application Ser. No. 15/635,597 for Optical Redirection Adapter filed Jun. 28, 2017, now U.S. Pat. No. 10,120,268, which is a continuation application of U.S. patent application Ser. No. 15/082,393 for Optical Redirection Adapter filed Mar. 28, 2016 (and published Jul. 21, 2016 as U.S. Patent Publication No. 2016/0209735), now U.S. Pat. No. 9,696,612, which is a continuation application of U.S. patent application Ser. No. 13/771,508 for Optical Redirection Adapter filed Feb. 20, 2013 (and published Aug. 21, 2014 as U.S. Patent Publication No. 2014/0232930), now U.S. Pat. No. 9,304,376. Each of the foregoing patent applications, patent publications, and patents is hereby incorporated by reference in its entirety.

FIELD OF THE INVENTION

The present invention relates to the field of electronic device accessories, more specifically, to an optical redirection adapter for an electronic device.

BACKGROUND

A number of electronic devices that include built-in cameras are available to consumers. Typically, these cameras are placed on the side of the electronic device opposite the primary user-interface (e.g., a touch-screen and/or keypad). In other words, the cameras are typically placed on the back side of the electronic device.

For certain functions (e.g., taking a picture or imaging a symbol for decoding), pointing the end or edge of the electronic device at the intended target is more intuitive. When pointing the electronic device in this manner, however, the camera is facing downward rather than at the target. Thus, users that want to take a picture or image/read a symbol (e.g., a barcode) must hold the device and their head in a manner that is not ergonomically sound potentially resulting in repeatable, wrist, neck, and/or eye strains or injury.

Therefore, a need exists for an accessory for an electronic device having a camera that permits ergonomically sound use of the camera.

SUMMARY

Accordingly, in one aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, when the adapter is attached to the electronic device, the optical element reflects light into the camera's field of view from a location along the electronic device's width that is different from the location of the camera's field of view along the electronic device's width.

In yet another exemplary embodiment, when the adapter is attached to the electronic device, the optical element reflects light into the camera's field of view from the center of the electronic device's width.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, when the adapter is attached to the electronic device, the optical element reflects light into the camera's field of view such that a reflected image is not flipped or rotated.

In yet another exemplary embodiment, the housing includes an optical opening.

In another aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view and from the center of the electronic device's width.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, when the adapter is attached to the electronic device, the optical element reflects light into the camera's field of view such that a reflected image is not flipped or rotated.

In yet another exemplary embodiment, the housing includes an optical opening.

In yet another aspect, the present invention embraces an optical redirection adapter for an electronic device having a camera that includes a housing for attaching to the electronic device and an optical element attached to the housing and positioned such that, when the adapter is attached to the electronic device, the optical element is positioned in the camera's field of view. When the adapter is attached to the electronic device, the optical element reflects light into the camera's field of view from a redirection angle that is offset from the camera's field of view and such that a reflected image is not flipped or rotated.

In an exemplary embodiment, the electronic device has an illumination element and the optical element is positioned such that, when the adapter is attached to the electronic device, the optical element reflects light from the illumination element at the redirection angle.

In another exemplary embodiment, the redirection angle is approximately 90 degrees.

In yet another exemplary embodiment, when the adapter is attached to the electronic device, the optical element reflects light into the camera's field of view from a location along the electronic device's width that is different from the location of the camera's field of view along the electronic device's width.

In yet another exemplary embodiment, when the adapter is attached to the electronic device, the optical element reflects light into the camera's field of view from the center of the electronic device's width.

In yet another exemplary embodiment, the optical element is positioned in the housing such that, when the adapter is attached to the electronic device, the optical element is immediately adjacent the camera's external components.

In yet another exemplary embodiment, the housing includes a device opening for receiving the electronic device.

In yet another exemplary embodiment, the housing attaches to the electronic device via a friction fit between the housing and the electronic device.

In yet another exemplary embodiment, the housing attaches to the electronic device via a friction fit between the housing and the electronic device and the housing includes a notch for adjusting the strength of the friction fit between the housing and the electronic device.

In yet another exemplary embodiment, the housing attaches to the electronic device via a positive latch.

In yet another exemplary embodiment, the housing attaches to the electronic device via a positive latch having a quick release.

In yet another exemplary embodiment, the optical redirection adapter includes a collimating lens attached to the optical element.

In yet another exemplary embodiment, the optical redirection adapter includes a laser aimer attached to the housing.

In yet another exemplary embodiment, the optical redirection adapter includes an auxiliary attachment mechanism for maintaining free attachment of the adapter to the electronic device.

In yet another exemplary embodiment, the optical redirection adapter includes a lanyard for maintaining free attachment of the adapter to the electronic device.

In yet another exemplary embodiment, the optical redirection adapter includes a rubber surface on the exterior of the housing.

In yet another exemplary embodiment, the housing includes an access opening.

In yet another exemplary embodiment, the optical element includes a prism.

In yet another exemplary embodiment, the optical element includes a mirror.

In yet another exemplary embodiment, the housing includes an optical opening.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an accessory for an electronic device having a camera that permits ergonomically sound use of the camera. More specifically, the present invention embraces an optical redirection adapter for an electronic device that allows a user to point the end or edge of the electronic device at an intended camera or imaging target.

The optical redirection adapter of the present invention typically includes a housing for attaching to an electronic device and an optical element attached to the housing. The optical element is positioned (i.e., with respect to the electronic device and/or the housing) such that, when the adapter is attached to an electronic device having a camera, the optical element is positioned in the camera's field of view. The optical element reflects light into the camera's field of view from a redirection angle that is offset from the camera's field of view. In other words, the optical element redirects the camera's effective field of view from its standard or typical field of view (i.e., the camera's field of view without an optical adapter).

The term electronic device is used herein in a broad sense and includes cellular phones, smartphones, tablet devices, and portable audio devices. Exemplary electronic devices include devices that run Apple, Inc.'s iOS operating system, such as any of the iPhone, iPad, or iPod models. That said, electronic devices running on an Android, Microsoft, or any other operating system are also within the scope of the present invention.

Figure 1:
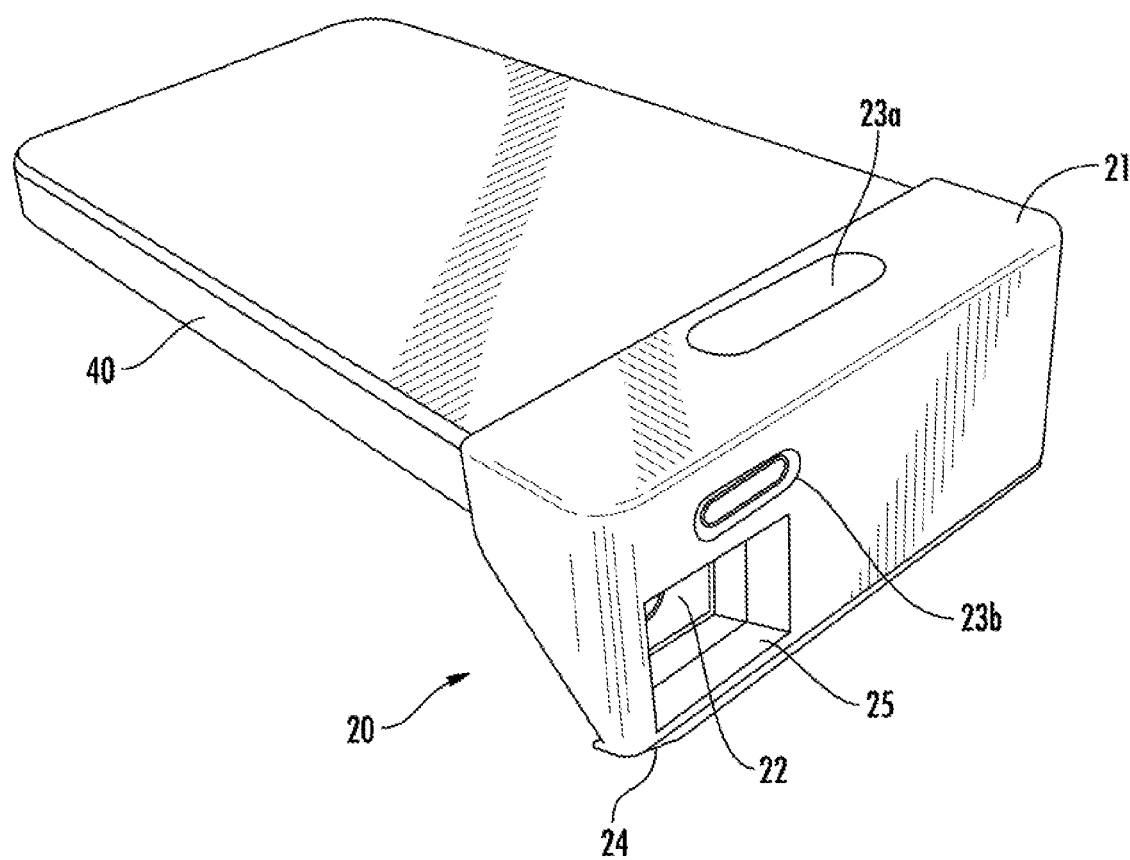
FIG. 1 depicts a perspective view of an exemplary optical redirection adapter attached to an electronic device.

FIG. 1 depicts a perspective view of an exemplary optical redirection adapter 20 attached to an electronic device 40. The optical redirection adapter 20 includes a housing 21 and an optical element 22. In the depicted embodiment, the optical element 22 is a prism, but the optical element 22 may include a mirror or lens (e.g., a collimating lens). Additionally, the optical element 22 may include a combination of prisms, mirrors, and/or lenses. The housing 21 includes an optical opening 25 to permit light to enter and exit the optical element 22. In some embodiments, the optical redirection adapter 20 may include a collimating lens attached to the optical element 22.

In exemplary embodiments, the optical redirection adapter 20 may include a symbol on the housing 21. The symbol may be a logo, trademark, or decoration. The housing 21 may include a pocket or recess to receive such a symbol.

Figure 3:
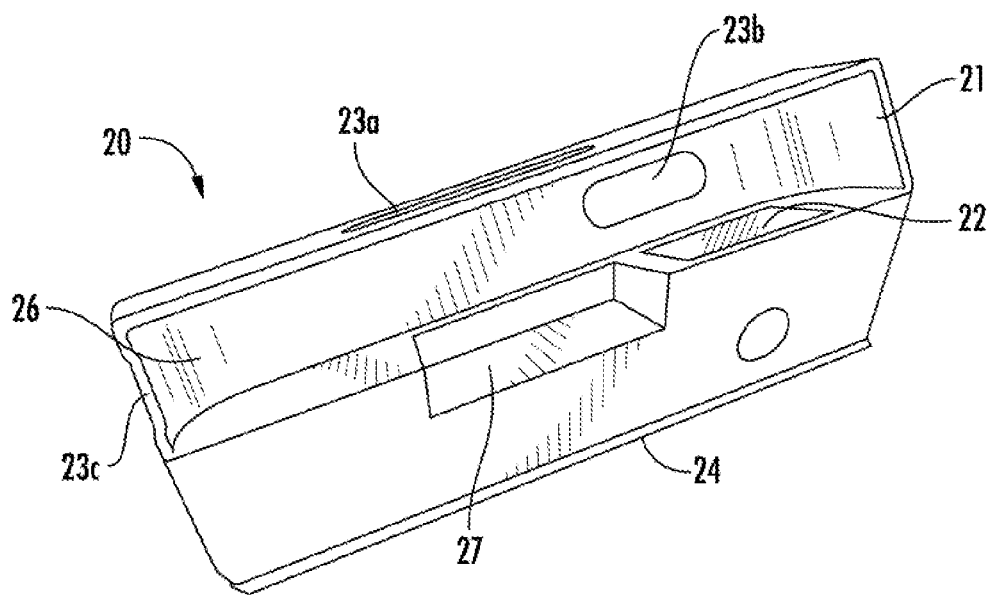
FIG. 3 depicts a rear view of the exemplary optical redirection adapter of FIG. 1 without the electronic device.

The housing 21 includes a number of access openings 23a, 23b, and 23c (See FIG. 3). The housing 21 typically includes access openings to maintain or enhance the functionality of features on the exterior of the electronic device 40. For example, access opening 23a maintains the functionality of a speaker and microphone on the electronic device 40, and access opening 23b provides access to an external button on the electronic device 40.

The exemplary optical redirection adapter 20 also includes a rubber surface 24 on the exterior of the housing 21. As depicted, the rubber surface 24 is located on the lower portion of the housing 21 to prevent sliding of the electronic device 40 and optical redirection adapter 20 when they are placed on a surface. Rather than a rubber surface 24, the optical redirection adapter 20 may include an anti-skid or increased friction surface of other types of materials or textures capable of providing anti-skid or increased friction characteristics. Furthermore, the optical redirection adapter 20 may include such a surface in other locations on the housing 21 or in multiple places on the housing 21.

Figure 2:
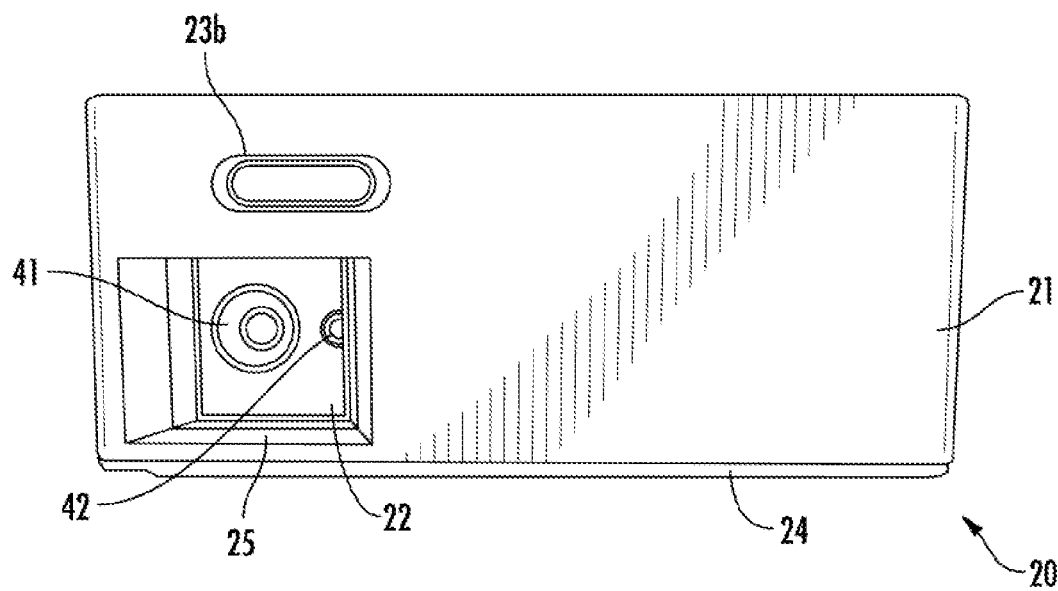
FIG. 2 depicts a front view of the exemplary optical redirection adapter of FIG. 1.

FIG. 2 depicts a front view of the exemplary optical redirection adapter 20 of FIG. 1. In this front view, the camera 41 and illumination element 42 of the electronic device 40 are visible through the optical element 22. The camera 41 and illumination element 42 face downward from the bottom surface of the electronic device 40, but the optical element 22 reflects light at a redirection angle such that camera 41 and illumination element 42 appear to face outward from the front edge of the electronic device 40 and optical redirection adapter 20.

In the depicted embodiment, the redirection angle is approximately 90 degrees. In other words, rather than receiving light from a field of view extending downward from the electronic device 40 (i.e., the camera's standard or typical field of view), the camera 41 receives light from an effective field of view that extends horizontally or parallel to the length of the surface of the electronic device 40 upon which the camera 41 is located. Similarly, rather than shining downward from the electronic device 40, light from the illumination element 42 is reflected by the optical element 22 to emit horizontally or parallel to the length of the surface of the electronic device 40 upon which the illumination element 42 is located. The redirection angle is the angle between the central axis of the camera's standard or typical field of view (i.e., without the adapter) and the central axis of the camera's effective field of view (i.e., with the adapter) as measured perpendicular to the electronic device's width.

Furthermore, the optical element 22 may reflect light at a redirection angle of between about 45 degrees and 115 degrees (e.g., between about 60 degrees and 85 degrees). The redirection angle achieved by the optical element 22 facilitates an ergonomically sound use of the camera 41 and illumination element 42. For example, rather than aiming the bottom surface of the electronic device 40 at an imaging target, a user may point the end or edge of the electronic device 40 equipped with the optical redirection adapter 20 in a more intuitive manner.

In exemplary embodiments, the optical element 22 reflects light into the camera's field of view such that the reflected image is not flipped or rotated. That said, the optical element 22 may reflect light into the camera's field of view such that the reflected image is flipped and/or rotated.

FIG. 3 depicts a rear view of the exemplary optical redirection adapter 20 of FIG. 1 without the electronic device 40. The housing 21 includes a device opening 26 for receiving the electronic device and a notch 27. In this embodiment, the housing 21 attaches to the electronic device via a friction fit that is achieved by the device opening 26 and may be adjusted by the notch 27. The device opening 26 is typically shaped to correspond to the outer shape and contours of the electronic device while providing enough friction to keep the optical redirection adapter 20 attached to the electronic device. An insert, such as a foam or rubber pad, may be placed in the notch 27 to engage both the housing 21 and the electronic device thereby increasing the strength of the friction fit. In alternative embodiments, the optical redirection adapter 20 may include a positive latch (e.g., having a quick release) for attaching the housing 21 to the electronic device.

As depicted, a portion of the optical element 22 is visible within the device opening 26. The visible portion of the optical element 22 is positioned in the housing 21 such that, when the optical redirection adapter 20 is attached to the electronic device, the optical element 22 is immediately adjacent the camera's external components.

Figure 4:
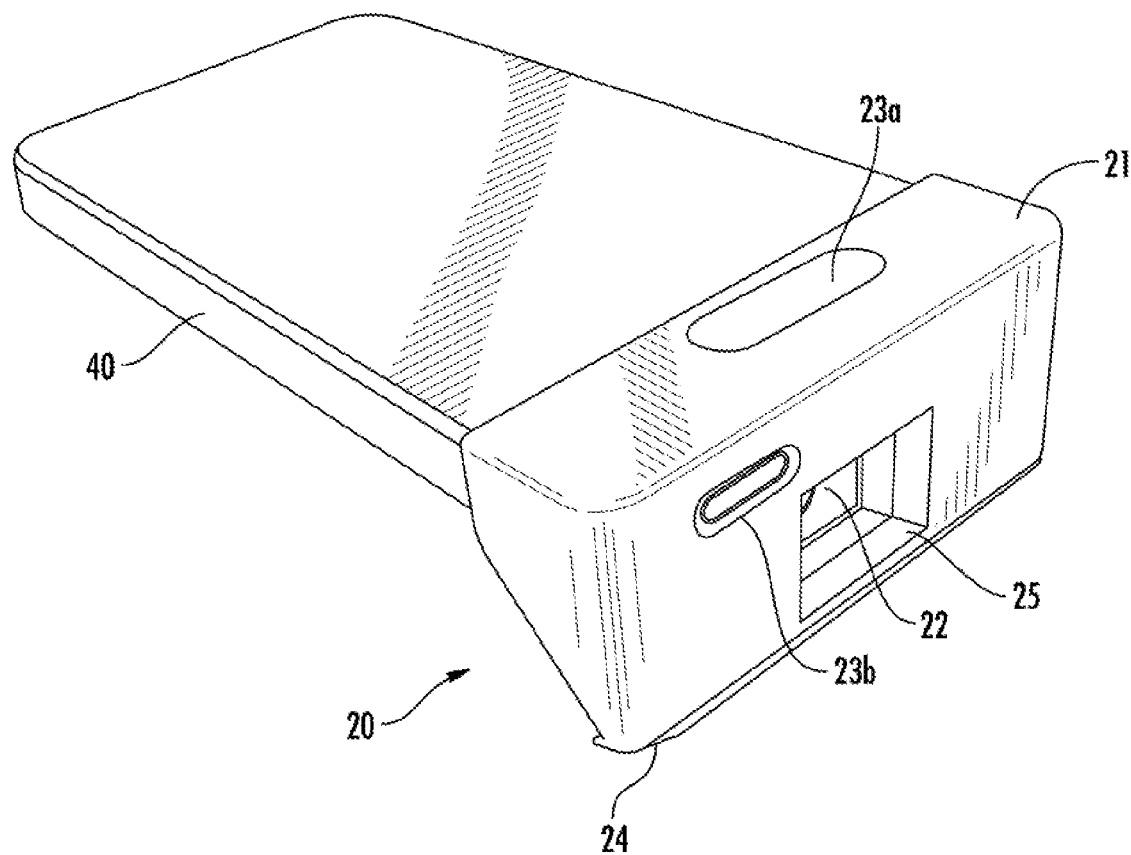
FIG. 4 depicts a perspective view of another exemplary optical redirection adapter attached to an electronic device.

FIG. 4 depicts a perspective view of another exemplary optical redirection adapter 20 attached to an electronic device 40. The optical redirection adapter 20 includes a housing 21 and an optical element 22. The housing 21 includes an optical opening 25 located at a different location along the electronic device's width as compared to FIG. 1. In particular, the optical opening 25 is located at the center of the electronic device's width.

Figure 5:
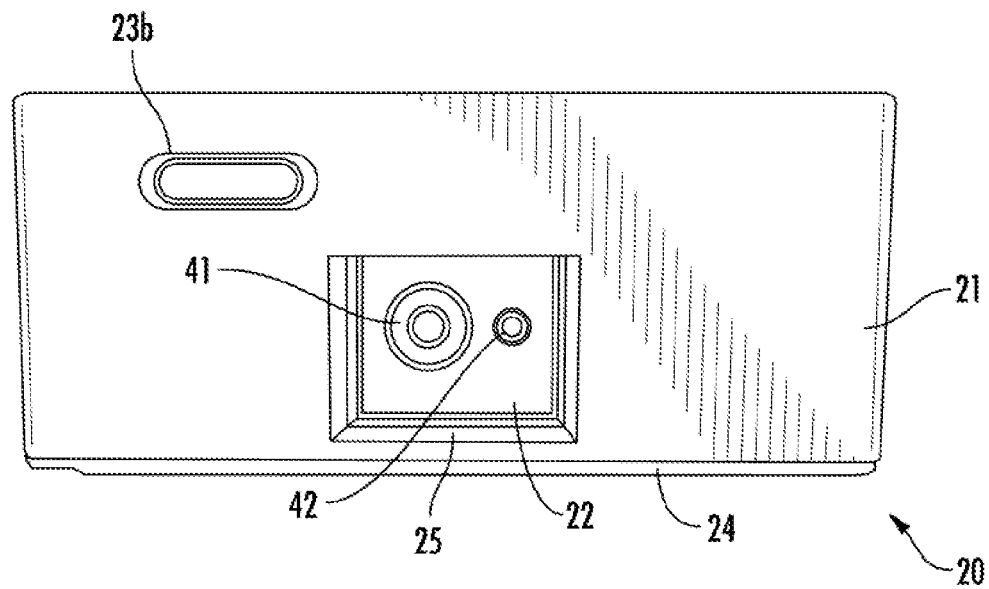
FIG. 5 depicts a front view of the exemplary optical redirection adapter of FIG. 4.

FIG. 5 depicts a front view of the exemplary optical redirection adapter 20 of FIG. 4. In this front view, the camera 41 and illumination element 42 of the electronic device 40 are visible through the optical element 22.

The electronic device 40 of FIGS. 4-5 is the same electronic device 40 of FIGS. 1-2. Furthermore, the camera 41 and illumination element 42 face downward from the left portion (as viewed in FIGS. 2 and 5) of the electronic device's bottom surface. Thus, the exemplary optical redirection adapter 20 of FIGS. 1-3 includes an optical element 22 that reflects light into the camera's field of view from the same location along the electronic device's width as the location of the camera's field of view along the electronic device's width.

Figure 6:
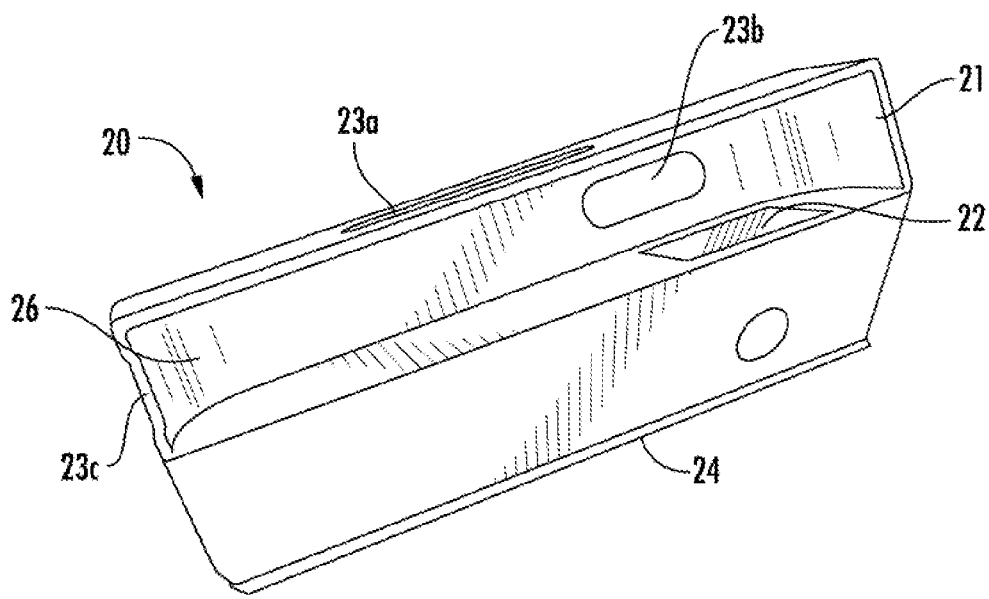
FIG. 6 depicts a rear view of the exemplary optical redirection adapter of FIG. 4 without the electronic device.

The exemplary optical redirection adapter 20 of FIGS. 4-6, however, includes an optical element 22 that reflects light into the camera's field of view from a location along the electronic device's width that is different from the location of the camera's field of view along the electronic device's width. In particular, the optical element 22 reflects light into the camera's field of view from the center of the electronic device's width.

FIG. 6 depicts a rear view of the exemplary optical redirection adapter 20 of FIG. 4 without the electronic device 40. The housing 21 includes a device opening 26 for receiving the electronic device. As depicted, a portion of the optical element 22 is visible within the device opening 26. The visible portion of the optical element 22 is positioned in the housing 21 such that, when the optical redirection adapter 20 is attached to the electronic device, the optical element 22 is immediately adjacent the camera's external components.

The locations of the portions of the optical element 22 visible in FIGS. 5 and 6 demonstrate that the optical element 22 reflects light within the housing 21 along the electronic device's width. In the exemplary optical redirection adapter 20 of FIGS. 4-6, the optical element 22 reflects light from the left portion (as viewed in FIG. 5) of the electronic device's width to the center of the electronic device's width. Other exemplary optical redirection adapters may include optical elements that reflect light from the right portion (as viewed in FIG. 5) of the electronic device's width to the center of the electronic device's width.

Optical elements that reflect light along the electronic device's width facilitate an ergonomically sound use of the camera and illumination element. For example, rather than aiming the left or right portion of the electronic device at an imaging target, a user may point the width-wise center of the electronic device equipped with an optical redirection adapter including such an optical element in a more intuitive manner.

Exemplary embodiments of the optical redirection adapter may include a laser aimer attached to the housing. The laser aimer is typically positioned such that the laser beam or laser pattern emitted by the laser aimer corresponds to the effective field of view of the electronic device's camera as modified by the optical element.

Exemplary embodiments of the optical redirection adapter may also include an auxiliary attachment mechanism (e.g., a lanyard) to maintain a fee attachment of the adapter to the electronic device when the adapter is not in use.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A barcode reading adapter, comprising:
a barcode reader adapter housing defining an opening to receive an electronic device and an optical opening, wherein the optical opening is aligned with a field of view of a camera of the electronic device and exposes an optical element such that light that enters the barcode reader adapter housing through the optical opening is reflected into the field of view of the camera at a redirection angle by the optical element, wherein the optical opening is located at a location along a width of the electronic device that is different from a location of the camera along the width of the electronic device, and wherein the redirection angle is between 45 degrees and 115 degrees, wherein, when the barcode reader adapter housing is attached to the electronic device, the optical element reflects light into the camera's field of view such that a reflected image is not flipped or rotated.

2. The barcode reading adapter according to claim 1, wherein the electronic device comprises an illumination element, wherein the barcode reading adapter further comprises:
the optical element attached to the barcode reader adapter housing, wherein the optical element is positioned within the optical opening such that, when the barcode reading adapter is attached to the electronic device, the optical element reflects light from the illumination element of the electronic device at the redirection angle through the optical opening.

3. The barcode reading adapter according to claim 1, wherein the optical opening is aligned with an illumination element of the electronic device such that light is reflected from the illumination element at the redirection angle.

4. The barcode reading adapter according to claim 1, further comprising:

a laser aimer attached to the barcode reader adapter housing, wherein the laser aimer is positioned such that a laser beam emitted by the laser aimer corresponds to an effective field of view of the camera.

5. The barcode reading adapter according to claim 1, further comprising:
a laser aimer attached to the barcode reader adapter housing, wherein the laser aimer is positioned such that a laser pattern emitted by the laser aimer corresponds to an effective field of view of the camera.

6. The barcode reading adapter according to claim 1, wherein the light is reflected through the optical opening by at least one of a prism, a mirror, or a lens.

7. The barcode reading adapter according to claim 1, wherein the light that is reflected into the field of view of the camera through the optical opening is from an effective field of view that extends horizontally to a length of a surface of the electronic device.

8. The barcode reading adapter according to claim 1, wherein the redirection angle is between 60 degrees and 85 degrees.

9. The barcode reading adapter according to claim 1, wherein the optical opening is aligned with both the field of view of the camera of the electronic device and an illumination element.

10. A barcode reading adapter, comprising:
a barcode reader adapter housing defining an opening to receive an electronic device and an optical opening, wherein the optical opening is aligned with a field of view of a camera of the electronic device and exposes an optical element such that light that enters the barcode reader adapter housing through the optical opening is reflected into the field of view of the camera at a redirection angle by the optical element, wherein the optical opening is located at a center of location along a width of the electronic device that is different from a location of the camera along the width of the electronic device, and wherein the redirection angle is between 45 degrees and 115 degrees; and
an aimer attached to the barcode reader adapter housing, wherein the aimer is positioned such that a laser pattern emitted by the aimer corresponds to an effective field of view of the camera,
wherein, when the barcode reader adapter housing is attached to the electronic device, the optical element reflects light into the camera's field of view such that a reflected image is not flipped or rotated.

11. The barcode reading adapter according to claim 10, wherein the light is reflected through the optical opening by at least one of a prism, a mirror, or a lens.

12. The barcode reading adapter according to claim 11, wherein the light that is reflected into the field of view of the camera through the optical opening is from the effective field of view that extends horizontally to a length of a surface of the electronic device.

13. A method of reading a barcode through a barcode reading adapter, comprising:
receiving an electronic device via an opening of a barcode reader adapter housing of the barcode reading adapter; and
aligning an optical opening of the barcode reading adapter with a field of view of a camera of the electronic device, wherein the optical opening exposes an optical element such that light that enters the barcode reader adapter housing through the optical opening is reflected into the field of view of the camera at a redirection angle by the optical element, wherein the optical opening is located at a location along a width of the electronic device that is different from a location of the camera along the width of the electronic device, and wherein the redirection angle is between 45 degrees and 115 degrees, wherein, when the barcode reader adapter housing is attached to the electronic device, the optical element reflects light into the camera's field of view such that a reflected image is not flipped or rotated.

14. The method of claim 13, wherein the redirection angle is between 60 degrees and 85 degrees.

15. The method of claim 13, wherein the barcode reader adapter housing is configured to emit light from an illumination element.

16. The method of claim 15, wherein the electronic device comprises the illumination element, wherein the method further comprises:
attaching the optical element to the barcode reader adapter housing, wherein the optical element is positioned within the optical opening such that, when the barcode reading adapter is attached to the electronic device, the optical element reflects light from the illumination element of the electronic device at the redirection angle through the optical opening.

17. The method of claim 13, further comprising:
attaching a laser aimer to the barcode reader adapter housing, wherein the laser aimer is positioned such that a laser beam emitted by the laser aimer corresponds to an effective field of view of the camera.

18. The method of claim 13, further comprising:
attaching a laser aimer to the barcode reader adapter housing, wherein the laser aimer is positioned such that a laser pattern emitted by the laser aimer corresponds to an effective field of view of the camera.

19. The method of claim 13, wherein the light is reflected through the optical opening by at least one of a prism, a mirror, or a lens.

20. The method of claim 13, wherein the light that is reflected into the field of view of the camera through the optical opening is from an effective field of view that extends horizontally to a length of a surface of the electronic device.

* * * * *